United States Patent

Wheeler

[15] 3,655,916

[45] Apr. 11, 1972

[54] GAMMA CORRECTING PHOTOELECTRIC TRANSDUCER CIRCUITRY

[72] Inventor: Robert Charles Wheeler, Elba, N.Y.

[73] Assignee: Sylvania Electric Products Inc.

[22] Filed: Jan. 15, 1970

[21] Appl. No.: 3,030

[52] U.S. Cl. ........................178/5.4 R, 178/DIG. 16, 178/7.2

[51] Int. Cl. ......................H04n 9/53, H04n 9/08, H04n 5/20

[58] Field of Search ..................178/7.2 D, 7.2 B, 6, 5.4, 5.2, 178/6.7 A, 6.8; 250/206, 215, 217 CR; 307/311

[56] References Cited

UNITED STATES PATENTS

| | | | |
|---|---|---|---|
| 2,627,547 | 2/1953 | Bedford | 178/DIG. 16 |
| 2,804,574 | 8/1957 | Kingsbury | 250/206 |
| 3,002,048 | 9/1961 | Bailey et al. | 178/5.2 |
| 3,531,645 | 9/1970 | Marie De Jong | 250/206 |
| 2,764,697 | 9/1956 | Duke | 178/7.2 D |
| 2,829,194 | 4/1958 | Pohl | 178/5.4 CD |

FOREIGN PATENTS OR APPLICATIONS

| | | | |
|---|---|---|---|
| 1,087,866 | 9/1954 | France | 178/DIG. 16 |

*Primary Examiner*—Robert L. Griffin
*Assistant Examiner*—John C. Martin
*Attorney*—Norman J. O'Malley, Donald R. Castle and Thomas H. Buffton

[57] ABSTRACT

In a combined optical to electrical and electrical to optical signal transducer system employing a cathode ray tube and a periodically blanked-out light source, a gamma correcting photoelectric transducer circuit includes a light-responsive electrical device light-coupled to the light source and a non-linear electrical device coupling the light-responsive electrical device to a DC potential source.

13 Claims, 3 Drawing Figures

INVENTOR
ROBERT C. WHEELER

BY Donald R. Castle
ATTORNEY

INVENTOR
ROBERT C. WHEELER

BY

Donald R. Castle
ATTORNEY

GAMMA CORRECTING PHOTOELECTRIC TRANSDUCER CIRCUITRY

BACKGROUND OF THE INVENTION

The prior art suggests numerous forms of gamma correcting apparatus and systems. For example, one popular technique is to develop a video signal by disposing a flying spot scanner tube or light source and a photocell on opposite sides of a film. The light source scans the film and the photocell provides a video signal representative of varying transmission characteristics of the film. The video signal is amplified and applied to some form of DC restoration apparatus such as a single or double clamping system. Thereafter, the amplified and DC restored video signal is applied to gamma correcting circuitry, which may be in the form of a plurality of series or parallel connected diodes, and then to circuitry and apparatus associated with a cathode ray tube.

Specifically, one form of gamma correction and DC restoration circuitry is disclosed in a co-pending application entitled "DC Restoration and Gamma Correction System", U.S. Ser. No. 724,386, now U.S. Pat. No. 3,533,324, filed Apr. 26, 1968 in the names of Robert Roy Eckenbrecht and George Cleveland Waybright and assigned to the assignee of the present application. Therein, an amplified video signal is applied to a DC restoration means coupled intermediate a pulse signal source and potential reference level with a gamma correction means coupled to the DC restoration means and to the same DC potential reference level.

Although the above-mentioned circuitry combination has been extensively used in one known form of optical to electrical and electrical to optical signal transducer system, it has been found that the system does leave something to be desired with respect to cost, complexity, and accuracy of a multiple signal system. For instance, the video signals are amplified prior to gamma correction and amplified gamma corrected signals require amplifier stages and DC restoration and gamma correction apparatus with higher signal handling capabilities which, in turn, add to the cost and complexity of the system.

OBJECTS AND SUMMARY OF THE INVENTION

An object of the present invention is to provide an enhanced optical to electrical and electrical to optical signal transducer system. Another object of the invention is to provide improved gamma correcting circuitry for video signals. Still another object of the invention is to reduce the cost and complexity of gamma correcting apparatus in an optical to electrical signal transducer system. A further object of the invention is to provide an improved gamma corrective system suitable for a multiple signal optical to electrical signal transducer system.

These and other objects, advantages and capabilities are achieved in one aspect of the invention by an optical to electrical signal transducer having a light source and wherein a non-linear electrical device directly couples a DC potential source to a light-responsive electrical device with the light-responsive electrical device coupled to succeeding processing and display circuitry and light coupled to the light source.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings. The preferred embodiment will be discussed in terms of an integral television receiver and flying spot scanner system suitable for deriving a color image reproduction in response to either color television signals or color photographic films. Obviously, the invention is not limited to the particular system employed but the particular system is utilized as a vehicle for discussion.

Figure 1:
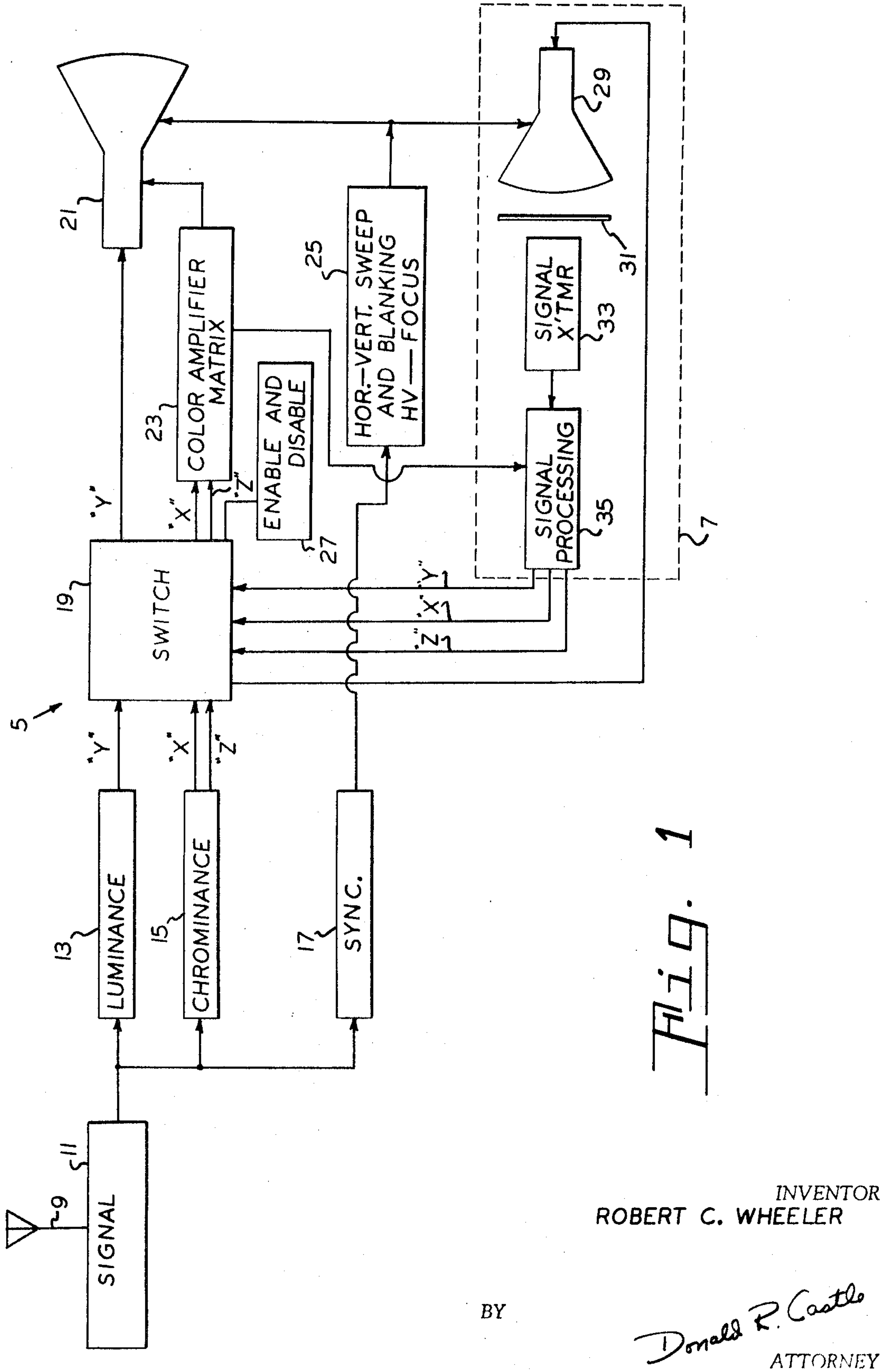
FIG. 1 is a diagram, in block form, of an integral optical to electrical and electrical to optical signal transducer system.

Referring to the drawings, FIG. 1 is a diagrammatic illustration, in block form, of an integrated electrical to optical and optical to electrical signal transducer system. The electrical to optical signal transducer 5 is illustrated in the form of a modified color television receiver while the optical to electrical signal transducer 7 is in the form of a flying spot scanner system. The electrical to optical signal transducer 5 has the capability of providing an image display in response to broadcast color television signals while the optical to electrical signal transducer 7 develops signals from photographic film and applies these signals to the electrical to optical signal transducer 5 to effect an image display.

Generally, the electrical to optical signal transducer 5 or modified color television receiver includes the usual antenna 9 and signal receiver 11. In the normal manner, the antenna 9 intercepts a broadcast color television signal which is coupled to the signal receiver 11 to provide a composite color signal. The composite color signal, in turn, is applied to a luminance channel 13, a chrominance channel 15, and a synchronization channel 17.

The luminance channel 13 provides a so-called "Y" signal, representative of luminance information, which is preferably applied via a switch means 19 to a color cathode ray tube display device 21. The chrominance channel 15 provides so-called "X" and "Z" signals, representative of chrominance information, in a manner well known in the art, which are applied via the switch means 19 and a color amplifier-matrix network 23 to the cathode ray tube display device 21.

The synchronization channel 17 energizes, in proper sequence, the usual blanking, horizontal and vertical sweep circuits, and high voltage and focus circuitry, block 25. In this manner, desired potentials are applied to the cathode ray tube display device 21 and associated deflection apparatus (not shown). Also, an enable and disable means 27 is coupled to the switch means 19 for controlling operation of the scanner tube 29 as will be explained hereinafter The flying spot scanner tube 29 of the optical to electrical signal transducer 7 is coupled to blanking, horizontal, and vertical sweep circuits, and high voltage and focus circuitry, block 25. The scanner tube 29 is also coupled by way of the switch means 19 to the enable and disable means 27.

A film holder 31 is spaced from the flying spot scanner tube 29 and a signal transmitter 33 is disposed on the opposite side of the film holder 31. The signal transmitter 33 includes all of the well known photoelectric and optical means and is coupled to a signal processing network 35. In turn, signals from the signal processing network 35 are applied by way of the switch means 19 and color amplifier-matrix network 23 to the cathode ray tube display device 21.

In this particular apparatus, the switch means 19 of the integral electrical to optical and optical to electrical signal transducer systems 5 and 7 serves to selectively couple signals derived from a color television broadcast or from photographic film disposed in the film holder 31 to the cathode ray tube display device 21. Thus, manipulation of the switch means 19 provides a viewer with the capability of selecting either a program broadcast or personal films for viewing.

Figures 2, 3:
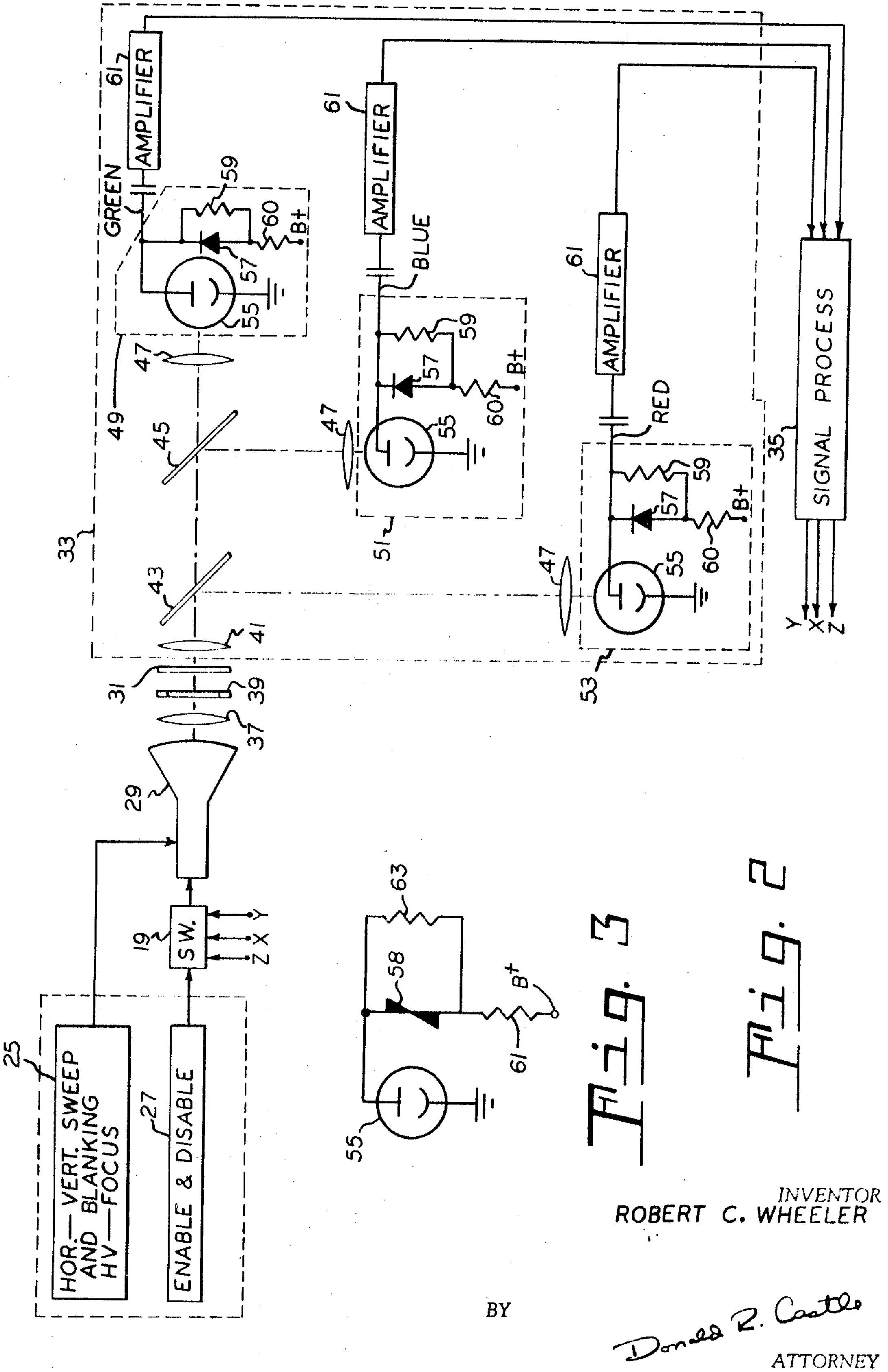
FIG. 2 is a diagram, in block and schematic form, illustrating a preferred form of gamma correction employed in an optical to electrical signal transducer system.
FIG. 3 illustrates an alternate form of gamma correction circuitry.

In a more specific embodiment, FIG. 2 illustrates an optical to electrical signal transducer 7 in the form of a flying spot scanner system. Again, the transducer 7 includes flying spot scanner tube 29, the film holder 31, the signal transmitter 33, and the signal processing network 35.

In this instance, the flying spot scanner tube 29 is coupled to the blanking, horizontal and vertical sweep circuits, and high voltage and focus circuitry, block 25, and by way of the switch means 19 to the disable and enable means 27 of the electrical to optical signal transducer or color TV receiver 5. The flying spot scanner tube 29 is disposed on one side of the film holder 31 with a converging type lens 37 and an aperture mask 39 intermediate thereto. The signal transmitter 33 is located on the opposite side of the film holder 31 and includes a first condenser lens 41, a pair of dichroic mirrors 43 and 45 and a second condenser lens 47 for each one of three individual gamma correcting and photoelectric transducer units, 49, 51 and 53 respectively.

Each one of the gamma correcting photoelectric transducer units, 49, 51, and 53 includes a light-responsive electrical device 55, a non-linear electrical device 57 shunted by an impedance 59, and a DC potential source B+. The light-responsive electrical device 55 is preferably in the form of a photomultiplier type tube having an output electrode coupled to succeeding amplification stages 61 and DC coupled by the non-linear electrical device 57 to the DC potential source B+. In turn, each one of the amplifier stages 61 is coupled to the signal processing network 35 which is coupled via the switch means 19 (FIG. 1) to the cathode ray tube display device 21 of the electrical to optical signal transducer 5 or color television receiver.

Preferably, the above-mentioned non-linear electrical device 57 is in the form of a diode. Moreover FIG. 3 illustrates an alternative form wherein the photocell 55 is coupled to a voltage dependent resistor 58 series connected by a resistor 61 to a potential source B+ and shunted by an impedance 63.

As to operation, the flying spot scanner tube 29 of the optical to electrical signal transducer 7 or flying spot scanner system is rendered operable or inoperable by a viewer in accordance with positional location of the switch means 19 coupling the disable-enable means 27 thereto. Also, potentials including a blanking and retrace potential available from the blanking, horizontal-vertical sweep, and high voltage-focus voltage circuitry, block 25, are applied to the flying spot scanner tube 29. Thus, the flying spot scanner tube 29 serves to provide a light source characterized by horizontal and vertical scanning as well as blanking during periods of horizontal and vertical retrace.

Light-coupled to the light-source or flying spot scanner tube 29, is each one of the gamma correcting photoelectric transducer units 49, 51 and 53. Since there is no light available from the scanner tube 29 during the period of horizontal and vertical retrace, the photocell 55 of each of the gamma correcting photoelectric transducer units 49, 51 and 53 is essentially cut off rendering a black level which is, for all practical purposes, the level of the DC potential source B+. Moreover, the black level, or level of the DC potential source B+, will be essentially the same for all of the units 49, 51 and 53.

Further, coupling a transducer load impedance in the form of a non-linear electrical device 57, such as a diode or non-linear resistor, having a current-voltage characteristic substantially inverse to the current-voltage characteristic of the cathode ray tube display device 21, serves to provide the desired gamma correction for the system. In other words, compression of the black and stretching of the whites by the display device 21 is compensated for by the non-linear device 57 acting in the load circuit which essentially stretches the blacks and compresses the whites by an amount which is inversely proportioned to the distortion introduced by the display device 21.

The impedance, resistor 59 in this instance, shunting the non-linear electrical device 57 may be employed as a means of limiting the maximum load impedance under low light signal conditions to effect a desired operational condition of the non-linear device 57. Also, a series connected resistor 60 may be utilized to effect limiting the minimum load impedance. Moreover, other non-linear devices such as voltage dependent resistors, vacuum tubes, and transistors are also applicable as the non-linear device 57.

Further, it should be noted that prior art systems employing AC coupled amplifier stages intermediate the light-responsive and gamma correction circuitry, require DC restoration, with its inherent distortion errors and complications, because of the dependency of the black level upon the magnitude of a video signal. In this instance, the DC coupling intermediate the light-responsive and non-linear electrical devices 55 and 57 eliminates the need for such restoration. Moreover, a plurality of devices, such as transistors, diodes, and resistors may be disposed intermediate the light-responsive and non-linear electrical devices 55 and 57 so long as the DC coupling is maintained.

Thus, there has been provided unique gamma correcting circuitry having numerous advantages over prior known circuitry. For instance, the circuitry inherently has a precisely referenced black level without resorting to added clamping circuitry with its associated cost and complexity, since the photomultiplier draws no current under "black" conditions. Also, the gamma correction is effected prior to amplification of the signal permitting employment of amplifier stages with lower signal handling capabilities, since the whiter portions of the signal have been greatly compressed prior to amplification. Moreover, multiple channel tracking is readily achieved by merely matching components used in the output circuits of the light-responsive electrical devices.

While there has been shown and described what is at present considered the preferred embodiment of the invention, it is obvious to those skilled in the art that various changes and modifications may be made therein without departing from the scope of the invention as defined by the appended claims.

I claim:

1. In a combined optical to electrical and electrical to optical signal transducer system for providing a visual display wherein the optical to electrical system includes a periodically blanked light source and succeeding signal processing and display circuitry and the electrical to optical system includes a cathode ray tube, gamma correcting and photoelectric transducer circuitry comprising in combination: a DC potential source;

a non-linear electrical device in the form of a diode coupled to said DC potential source; and a light-responsive electrical device light-coupled to said light source and having an output electrode coupled to said signal processing stages and DC coupled to said non-linear electrical device.

2. The combination of claim 1 wherein said light-responsive electrical device is in the form of a photocell.

3. The combination of claim 1 including an impedance shunting said non-linear electrical device.

4. The combination of claim 1 including an impedance in series connection with said non-linear device intermediate said DC potential source and said output electrode of said light-responsive electrical device.

5. The combination of claim 1 wherein said light-responsive electrical device is in the form of a photomultiplier tube and a resistor is shunted across said diode.

6. The combination of claim 1 including a plurality of pairs of series coupled light-responsive and non-linear electrical devices, each pair being light-coupled to said light source, DC coupled to said DC potential source, and coupled to succeeding processing and display circuitry.

7. In a combined optical to electrical and electrical to optical signal transducer system for providing a visual display wherein the optical to electrical system includes a periodically blanked light source and succeeding signal processing and display circuitry and the electrical to optical system includes a cathode ray tube, gamma correcting and photoelectric transducer circuitry comprising in combination: a DC potential source; a non-linear electrical device in the form of a voltage dependent resistor coupled to said DC potential source; and a light-responsive electrical device light-coupled to said light source and having an output electrode coupled to said signal processing stages and DC coupled to said non-linear electrical device.

8. Gamma correcting circuitry for a flying spot scanner system wherein the scanner includes a periodically blanked light source and processing and display circuitry, said circuitry comprising:

at least one light-responsive electrical device light-coupled to said light source, said device having an output electrode coupled to said processing and display circuitry;

a DC potential source; and a non-linear electrical device in the form of a diode coupling said output electrode to said DC potential source.

9. The combination of claim 8 including light-responsive electrical devices for providing video signals representative of the colors red, green and blue respectively.

10. The combination of claim 8 wherein said light-responsive electrical device is a photomultiplier tube with an impedance shunted across said diode.

11. The combination of claim 8 including an impedance in series connection with said DC potential source and said non-linear electrical device.

12. Gamma correcting circuitry for a flying spot scanner system wherein the scanner includes a periodically blanked light source and processing and display circuitry, said circuitry comprising:

at least one light-responsive electrical device light-coupled to said light source, said device having an output electrode coupled to said processing and display circuitry;

a DC potential source; and a non-linear electrical device in the form of a voltage dependent resistor coupling said output electrode to said DC potential source.

13. The circuitry of claim 12 including an impedance shunting said voltage dependent resistor.

* * * * *